United States Patent [19]

Egner-Walter et al.

[11] Patent Number: 4,648,148

[45] Date of Patent: Mar. 10, 1987

[54] DEVICE FOR A RECIPROCATING WIPER SYSTEM

[75] Inventors: Bruno Egner-Walter, Heilbronn; Walter Neubauer, Lauffen; Eckhardt Schmid, Brackenheim; Wolfgang Scholl, Gemmrigheim, all of Fed. Rep. of Germany

[73] Assignee: SWF Auto-Electric GmbH, Bietigheim-Bissingen, Fed. Rep. of Germany

[21] Appl. No.: 756,786

[22] Filed: Jul. 18, 1985

[30] Foreign Application Priority Data

Jul. 19, 1984 [DE] Fed. Rep. of Germany ....... 3426607

[51] Int. Cl.[4] ............................................. B60S 1/26
[52] U.S. Cl. ............................. 15/250.21; 15/250.23
[58] Field of Search ........... 15/250.23, 250.21, 250.29, 15/250.13, 250.30, 250.39

[56] References Cited

U.S. PATENT DOCUMENTS

| 2,494,408 | 1/1950 | Rice, Jr. | 15/250.23 |
| 3,667,082 | 6/1972 | Hoyler | 15/250.29 X |
| 3,831,220 | 8/1974 | Gmeiner et al. | 15/250.21 |
| 3,855,662 | 12/1974 | Fortin | 15/250.29 |

Primary Examiner—Peter Feldman
Attorney, Agent, or Firm—Donald J. Lenkszus

[57] ABSTRACT

The piston of a reciprocating wiper system on which a wiper arm is mounted is guided to be linearly displaceable in a capshaped bearing and has a slide which is longitudinally guided by two guide elements fixed to the housing. To achieve jam-free guidance on the guide elements without adjustment, the slide is guided with a capshaped bearing on one guide element in a closed manner. In contrast thereto there is a play between the slide and the second guide element in the plane defined by the guide elements.

17 Claims, 3 Drawing Figures

DEVICE FOR A RECIPROCATING WIPER SYSTEM

BACKGROUND OF THE INVENTION

The invention pertains to a reciprocating wiper system for motor vehicles.

A reciprocating wiper system includes a piston linearly displaceable and guided in a self adjusting bearing of a housing and includes a slide held on the piston. The bearing must be precise and long-lived. Furthermore it is necessary to guide the piston in such a way that it cannot be twisted about its longitudinal axis. In a reciprocating wiper system in which a wiper arm is fastened on the piston, forces act upon the piston which tend to twist it about its longitudinal direction as wiper arm moves a wiper blade across a window pane of a motor vehicle. If the piston is moved to and fro via a crank mechanism it is also affected by torsional forces.

It is possible to support the piston in two bearings spaced apart from each other. For this purpose a slide is mounted onto the end of the piston and the slide extends at least substantially perpendicular to the piston and is longitudinally guided on both sides of the piston by two guide elements fixed to the housing.

While the two bearings determine the longitudinal direction of the piston the latter is protected against twisting by the slide Another possibility is to directly support the piston in only one bearing and to design the slide and the guide elements in such a way and to arrange them relative to one another that the longitudinal direction of the piston is defined by the three bearings and the piston is protected against twisting at the same time.

SUMMARY OF THE INVENTION

It is one object of the present invention to develop a reciprocating wiper system for motor vehicles in such a way that the piston is guided safely and doesn't jam.

In a device according to the invention the piston in the bearing directly surrounding it and the slide on one guide element are guided in a closed manner. To be "guided in a closed manner" means that the respective guide element fixes the sliding body, thus the piston or the slide, in all directions perpendicular to the direction of displacement. Even if the bearing surrounding the piston is a self-adjusting bearing the piston is accurately guided free from play.

Because the bearing with which the slide is moved on one of the guide elements is at least self-adjusting in the plane defined by the two guide elements and there is a play between the slide and the second guide element, spacing tolerances and parallelism tolerances can be compensated for in the plane defined by them, so that the risk of the piston becoming jammed is small. Torsional forces affecting the piston can also be carried off via the slide over the second guide element. A bearing which is "self-adjusting in a plane" is swivellable about an axis standing perpendicularly on this plane.

It is advantageous, if the second guide element extends through an oblong hole of the slide. The hole is completely surrounded by material, so that the stability of the slide is greater than if an outwardly opening recess is used instead of the oblong hole. The play of the guide element in the oblong hole will be such that compensation may be provided for the maximal tolerance appearing between the spacing in the plane of the two guide elements.

BRIEF DESCRIPTION OF THE DRAWING

The invention will be better understood from a reading of the following detailed description in conjunction with the drawing in which.

DETAILED DESCRIPTION

Figure 1:
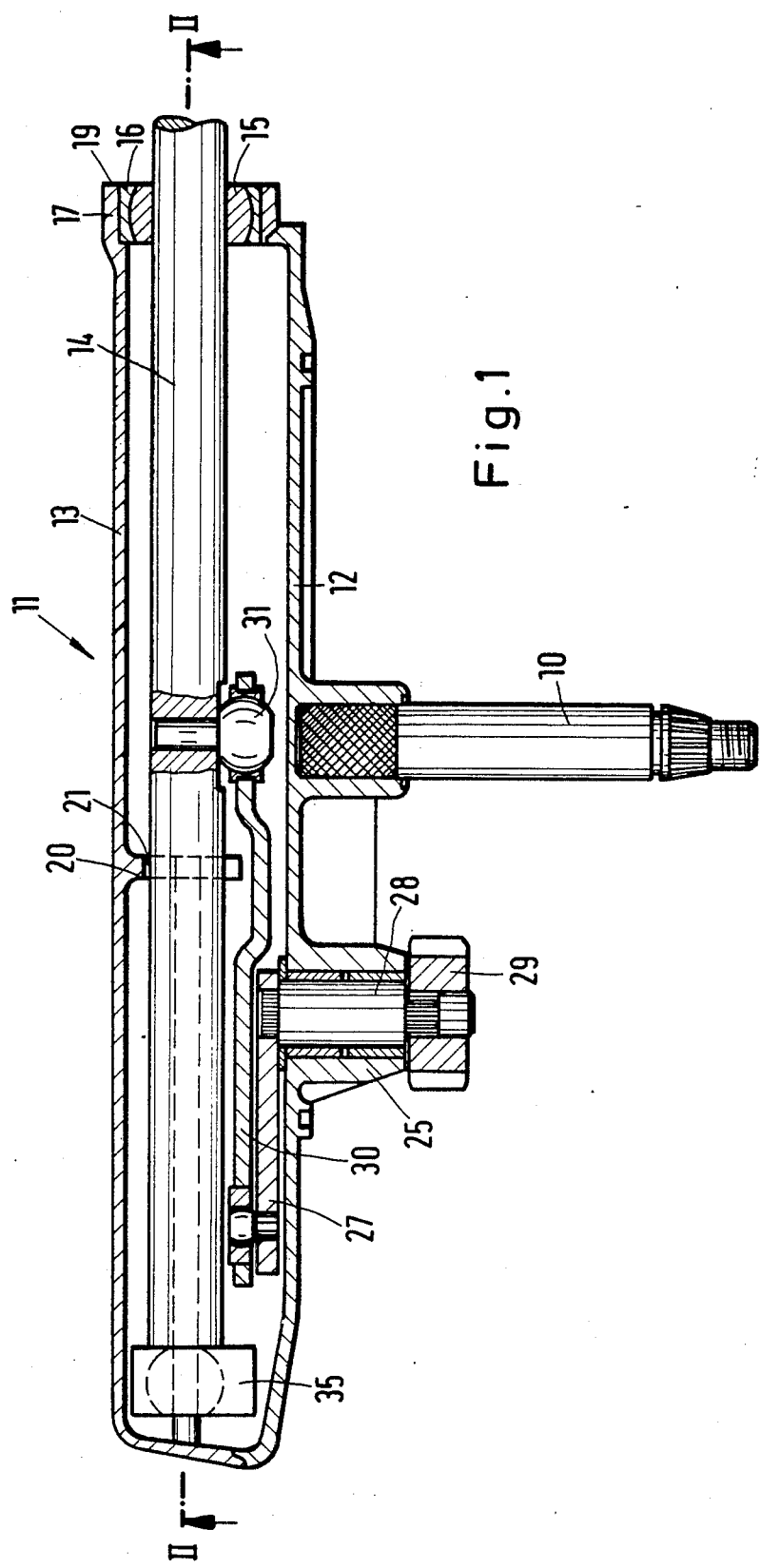
FIG. 1 is a longitudinal section through the housing of a reciprocating wiper system drivable in pendulum-fashion via a wiper shaft comprising a longitudinally displaceable piston mounted in the housing.
Figure 2:
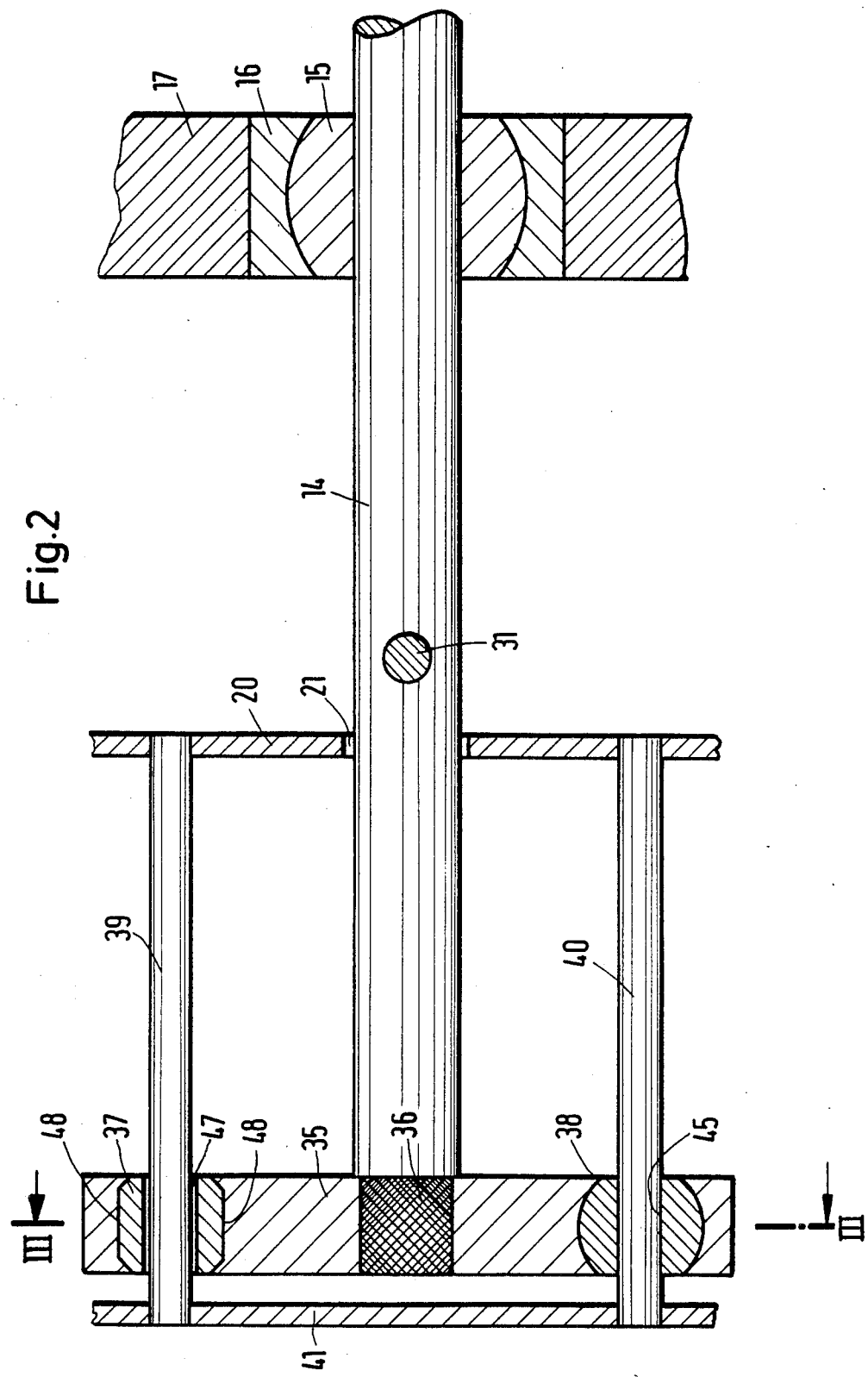
FIG. 2 is a section taken on the line II—II of FIG. 1 through those parts of the reciprocating wiper system which are principal for the guidance of the piston and in which the spacings of the parts from one another and the dimensions of the parts themselves do not correspond with the dimensions concerned of FIG. 1.
Figure 3:
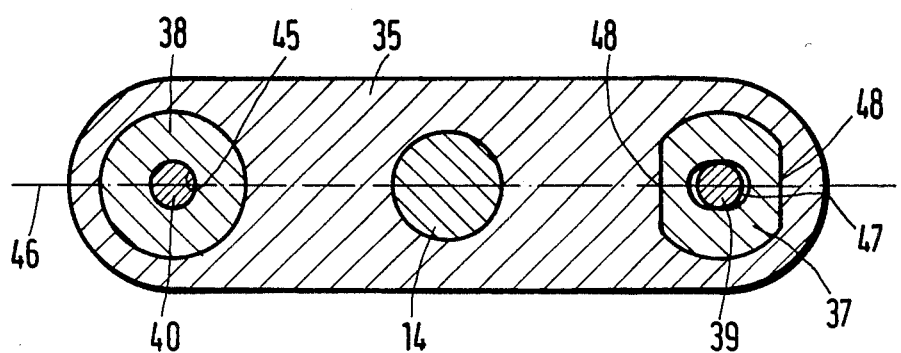
FIG. 3 is a section taken on the line III—III of FIG. 2.

In the reciprocating wiper system shown a housing 11 is mounted on a wiper shaft 10 in a manner protected against twisting. The housing is a part of the wiper arm and includes a base plate 12 and a cap 13. The base plate 12 is fastened on the wiper shaft 10. Within the housing 11 a piston 14 is mounted in a capshaped bearing 15. The latter is positioned in the bearing receptacle 16 which is pressed into the bearing seat 17 of the cap 13. The capshaped bearing 15 as a self-adjusting bearing is swivellable in the bearing receptacle 16 about two axes standing perpendicularly on each other and on the longitudinal direction of the piston 14. It directly adjoins the inner front side 19 of the housing 11. At a distance from the capshaped bearing 15 the cap 13 of the housing 11 has an inwardly projecting transverse wall 20, which has a bore 21 centrally, through which the piston 14 freely extends.

Between the transverse wall 20 and the bearing 15 a coupling rod 30 is fastened on the piston 14 via a ball pin 31, the other end of coupling rod 30 is pivoted to the free end of a crank 27. The latter is mounted on a shaft 28 in a manner protected against twisting. Shaft 28 is supported in a sleeve 25 of the base plate 12 and projects beyond this base plate and carries a toothed wheel 29 in a manner protected against twisting.

This toothed wheel 29 is rotated during the to-and-fro movement of the housing 11. Its rotary movement is transformed into a to-and-fro movement of the piston 14.

A slide 35 extending to two opposite sides of the piston 14 is held in a manner protected against twisting the rear end of the piston 14. The slide is made of plastics material and is directly injection-moulded onto a corrugated portion 36 of the piston 14. The slide 35 has a bearing 37 or 38 on each side spaced from the piston 14 by the same amount. Both bearings 37 and 38 are plain bearings as is the bearing 15. With the bearings 37 and 38 the slide 35 is guided on two cylindric guide columns 39 and 40, which are arranged in parallel to each other. Thus the total of three bearings for the piston 14 are arranged on the cap 13 of the housing 11 in such a way that the piston 14 may be moved to and fro in a radial direction relative to the wiper shaft 10.

The two columns 39 and 40 are pushed through bores in the transverse wall 20 into the rear-end front face 41 of the housing cap 13 and fastened by force-fitting. Thus they are positioned on the same part as the bearing 15, namely the cap 13 of the housing 11. They extend in parallel to the piston 14 and are diametrically positioned relative to this piston. It is true that it has been said that the two columns 39 and 40 are positioned in parallel to each other. This is correction principle and is desired of this design. However due to tolerances it has to be assumed that the actual position of the columns 39 and 40 relative to each other differs slightly from a parallel position.

Such tolerances could result in a tightness of the piston 14. To prevent this without subsequent adjusting actions the two bearings 37 and 38 of a reciprocating wiper system according to the invention are developed in a quite specific way. The bearing 38 has a bore 45 whose diameter corresponds to the diameter of the column 40. Thus the bearing 38 and the column 40 realise a closed guidance for the slide 35 that means a guidance fixing the slide in all directions perpendicularly to the longitudinal direction of the column 40. Thus the spacing between the piston 14 and the column 40 is firm, so that the piston 14 is guided free from play. Moreover the bearing 38 is a capshaped bearing which is swivellable both about an axis standing perpendicular on the plane 46 defined by the two parallel columns 39 and 40 and about an axis lying in this plane and extending perpendicularly to the longitudinal direction of the column 40.

In contrast to the capshaped bearing 38 the bearing 37 does not have a bore with a circular cross-section, but an oblong hole 47 whose longitudinal extension lies in the plane 46. Perpendicularly thereto the dimension of the oblong hole 47 corresponds to the diameter of the column 39, so that in this direction the column 39 also contributes to guide the slide 35 and the piston 14. Thus it can in particular take torsional forces.

So that the oblong hole 47 reliably retains its position in such a way that its longitudinal extension always lies in the plane 47, the bearing 37 and its seat in the slide 35 are formed in such a way that the bearing is protected against twisting about an axis parallel to the longitudinal direction of the column 39 and thus to the direction of movement of the piston 14.

To provide that the oblong hole 47 is not adjustable in the plane 46, the bearing 37 is also protected against twisting about an axis perpendicularly to the plane 46. The outside of the bearing 37 has been made of a capshaped bearing which has been flattened on two diametrical sides. Thus the bearing 37 has two flattened, planar areas 48 extending in parallel to each other. These two areas stand perpendicularly on a straight line running in the longitudinal extension of the oblong hole 47 and thus perpendicularly on the plane 46, however parallel to the guide column 39. The bearing 37 is therefore still swivellable about an axis lying in the plane 46 and standing perpendicularly on the column 39. It can thus be referred to as a flattened capshaped bearing.

Thus in the illustrative embodiment all tolerances between the guide columns 39 and 40 and between these guide columns and the bearing receptacle 16 for the bearing 15 can be compensated for. The oblong hole 47 makes it possible to compensate for tolerances of the spacing between the two guide columns 39 and 40. The swivellability of the bearings 15 and 38 in the plane 46 makes it possible to compensate for tolerances of the spacing of the axis of the guide column 40 from the center of the bearing 15. Finally tolerances of the three bearings perpendicularly to the plane 46 can be compensated for by the swivellability of the bearings 15, 37 and 38 about axes lying in this plane.

What is claimed is:

1. A reciprocating wiper system comprising:
   a housing;
   a self-adjusting bearing supported in said housing;
   a piston linearly displaceable in and guided by said self-adjusting bearing;
   a slide protected against twisting and longitudinal displacement and held on said piston such that it extends substantially perpendicular to said piston;
   first and second guide elements fixed to said housing for longitudinally guiding said slide on both sides of said piston; and
   a second self-adjusting bearing for guiding said slide in a closed manner on said first guide element, said second self-adjusting bearing being carried by said slide and being self-adjusting in at least a plane defined by said first and second guide elements;
   said slide being displaceable on said second guide element with play between said slide and said second guide element.

2. A device in accordance with claim 1, wherein:
   said slide includes an oblong hole; and
   said second guide element extends through said oblong hole.

3. A device in accordance with claim 2, wherein:
   the play between said oblong hole and said record guide element is such that the maximal tolerance of the spacing between said first and second guide elements in said plane can be compensated for.

4. A device in accordance with claim 1, comprising:
   a third bearing placed in said slide, said third bearing having an oblong hole, said second guide element extending through said oblong hole.

5. A device in accordance with claim 4, wherein the play between said oblong hole and said second guide element is such that the maximal tolerance of the spacing between said first and second guide elements in said plane can be compensated for.

6. A device in accordance with claim 4, wherein:
   said third bearing is held on said slide in a manner protected against twisting on an axis in the direction of movement of said piston.

7. A device in accordance with claim 6, wherein:
   said third bearing is held on said slide in a manner protected against twisting on an axis perpendicularly to said plane.

8. A device in accordance with claim 4, wherein:
   said third bearing has a flattened area outwardly which rests against a corresponding area of said slide.

9. A device in accordance with claim 8, wherein:
   said flattened area is perpendicular to said plane.

10. A device in accordance with claim 4, wherein:
    said third bearing has two outwardly flattened areas parallel to each other and resting against corresponding area of said slide.

11. A device in accordance with claim 4, wherein:
    said second self-adjusting bearing and said third bearing are self-adjusting perpendicularly to said plane.

12. A device in accordance with claim 1, wherein:
    said first bearing is a capshaped bearing.

13. A device in accordance with claim 4, wherein:
    said third bearing is a capshaped bearing outwardly and having at least one flattened area.

14. A device in accordance with claim 1, wherein:

said first and second guide elements are cylindric columns.

15. A device in accordance with claim 1, wherein: said first and second guide elements are fastened on the same integrally formed part of said housing.

16. A device in accordance with claim 4, wherein: said slide is substantially made of plastics material and said second and third bearings are each movably injection-moulded in said plastics material.

17. A device in accordance with claim 1, wherein: said slide is substantially made of plastics material and said piston is injection-moulded in said slide.

* * * * *